(12) United States Patent
Akasaka et al.

(10) Patent No.: US 9,515,733 B2
(45) Date of Patent: Dec. 6, 2016

(54) MITIGATION OF SPECTRAL OFFSET IN AN OPTICAL FILTER

(71) Applicant: Fujitsu Limited, Kawasaki-shi, Kanagawa (JP)

(72) Inventors: Youichi Akasaka, Allen, TX (US); Jeng-Yuan Yang, Garland, TX (US); Motoyoshi Sekiya, Richardson, TX (US); Hiroki Ooi, Kawasaki (JP); Satoru Okano, Yokohama (JP); Takuji Maeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/639,349

(22) Filed: Mar. 5, 2015

(65) Prior Publication Data

US 2016/0261343 A1    Sep. 8, 2016

(51) Int. Cl.
*H04B 10/079* (2013.01)
*H04B 10/2507* (2013.01)

(52) U.S. Cl.
CPC .. *H04B 10/25073* (2013.01); *H04B 10/07955* (2013.01)

(58) Field of Classification Search
CPC ............... H04B 10/25073; H04B 10/07955
USPC .......................................... 398/38
See application file for complete search history.

(56) References Cited

U.S. PATENT DOCUMENTS

| | | | | |
|---|---|---|---|---|
| 8,655,170 B2 | 2/2014 | Shukunami et al. | ........... | 398/26 |
| 2009/0274457 A1* | 11/2009 | Cahill | .............. | H04B 10/07955 398/38 |
| 2011/0311222 A1* | 12/2011 | Nakamura | ....... | H04B 10/07953 398/26 |
| 2012/0051737 A1* | 3/2012 | DeAndrea | ............ | H04B 10/695 398/25 |
| 2014/0037287 A1* | 2/2014 | Liu | .................. | H04B 10/07955 398/38 |
| 2014/0270756 A1* | 9/2014 | Oda | ................... | H04B 10/0791 398/26 |
| 2014/0369678 A1 | 12/2014 | Yang et al. | ..................... | 398/26 |

\* cited by examiner

*Primary Examiner* — Dalzid Singh
(74) *Attorney, Agent, or Firm* — Baker Botts L.L.P.

(57) ABSTRACT

Methods and systems for mitigating spectral offset may use a scanning optical filter to scan different frequencies (or wavelengths) in a signal bandwidth of an optical channel. The maximum optical power value for the optical channel may be accurate determined as well as an effective wavelength corresponding to the maximum optical power value.

21 Claims, 6 Drawing Sheets

MITIGATION OF SPECTRAL OFFSET IN AN OPTICAL FILTER

BACKGROUND

Field of the Disclosure

The present disclosure relates generally to optical communication networks and, more particularly, to methods and systems for mitigation of spectral offset in an optical filter.

Description of the Related Art

Telecommunication, cable television and data communication systems use optical networks to rapidly convey large amounts of information between remote points. In an optical network, information is conveyed in the form of optical signals through optical fibers. Optical fibers may comprise thin strands of glass capable of communicating the signals over long distances. Optical networks often employ modulation schemes to convey information in the optical signals over the optical fibers. Such modulation schemes may include phase-shift keying (PSK), frequency-shift keying (FSK), amplitude-shift keying (ASK), and quadrature amplitude modulation (QAM).

In PSK, the information carried by the optical signal may be conveyed by modulating the phase of a reference signal, also known as a carrier wave. The information may be conveyed by modulating the phase of the signal itself using differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

PSK and QAM signals may be represented using a complex plane with real and imaginary axes on a constellation diagram. The points on the constellation diagram representing symbols carrying information may be positioned with uniform angular spacing around the origin of the diagram. The number of symbols to be modulated using PSK and QAM may be increased and thus increase the information that can be carried. The number of signals may be given in multiples of two. As additional symbols are added, they may be arranged in uniform fashion around the origin. PSK signals may include such an arrangement in a circle on the constellation diagram, meaning that PSK signals have constant power for all symbols. QAM signals may have the same angular arrangement as that of PSK signals, but include different amplitude arrangements. QAM signals may have their symbols arranged around multiple circles, meaning that the QAM signals include different power for different symbols. This arrangement may decrease the risk of noise as the symbols are separated by as much distance as possible. A number of symbols "m" may thus be used and denoted "m-PSK" or "m-QAM."

Examples of PSK and QAM with a different number of symbols can include binary PSK (BPSK or 2-PSK) using two phases at 0° and 180° (or 0 and $\pi$) on the constellation diagram; or quadrature PSK (QPSK, 4-PSK, or 4-QAM) using four phases at 0°, 90°, 180°, and 270° (or 0, $\pi/2$, $\pi$, and $3\pi/2$). Phases in such signals may be offset. Each of 2-PSK and 4-PSK signals may be arranged on the constellation diagram.

M-PSK signals may further be polarized using techniques such as dual-polarization QPSK (DP-QPSK), wherein separate m-PSK signals are multiplexed by orthogonally polarizing the signals. M-QAM signals may also be polarized using techniques such as dual-polarization 16-QAM (DP-16-QAM), wherein separate m-QAM signals are multiplexed by orthogonally polarizing the signals.

Optical networks may also include various optical elements, such as amplifiers, dispersion compensators, multiplexer/demultiplexer filters, wavelength selective switches, optical switches, couplers, etc. to perform various operations within the network. In particular, optical networks may include costly optical-electrical-optical (O-E-O) regeneration at reconfigurable optical add-drop multiplexers (ROADMs) when the reach of an optical signal is limited in a single optical path.

As data rates for optical networks continue to increase, reaching up to 1 terabit/s (1 T), the demands on optical signal-to-noise ratios (OSNR) also increase, for example, due to the use of advanced modulation formats, such as QAM and PSK with dual polarization. When an OSNR monitor does not measure in-band OSNR for an optical channel, the actual quality of the optical channel may not be accurately determined. An optical filter used for OSNR monitoring may exhibit a frequency (or wavelength) offset with respect to the optical channel being filtered.

SUMMARY

In one aspect, a disclosed method for mitigation of spectral offset in an optical filter includes receiving a first optical signal at an optical filter, the first optical signal including a first optical channel having a first nominal wavelength and a signal bandwidth at the first nominal wavelength. The method may include programming the optical filter with a passband at the first nominal wavelength to generate a filtered optical signal. The method may further include measuring a first optical power value of the filtered optical signal. The method may still further include programming the optical filter with the passband at additional wavelengths within the signal bandwidth. The method may also include measuring additional optical power values respectively for each of the additional wavelengths. Based on the first optical power value and the additional optical power values, the method may include determining a maximum optical power value and an effective wavelength for the first optical signal. The first optical channel may have the maximum power value at the effective wavelength.

Additional disclosed aspects for mitigation of spectral offset in an optical filter include a scanning optical filter, an OSNR monitor, an optical add-drop multiplexer (OADM) including an OSNR monitor, and an optical communication system, as described herein.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
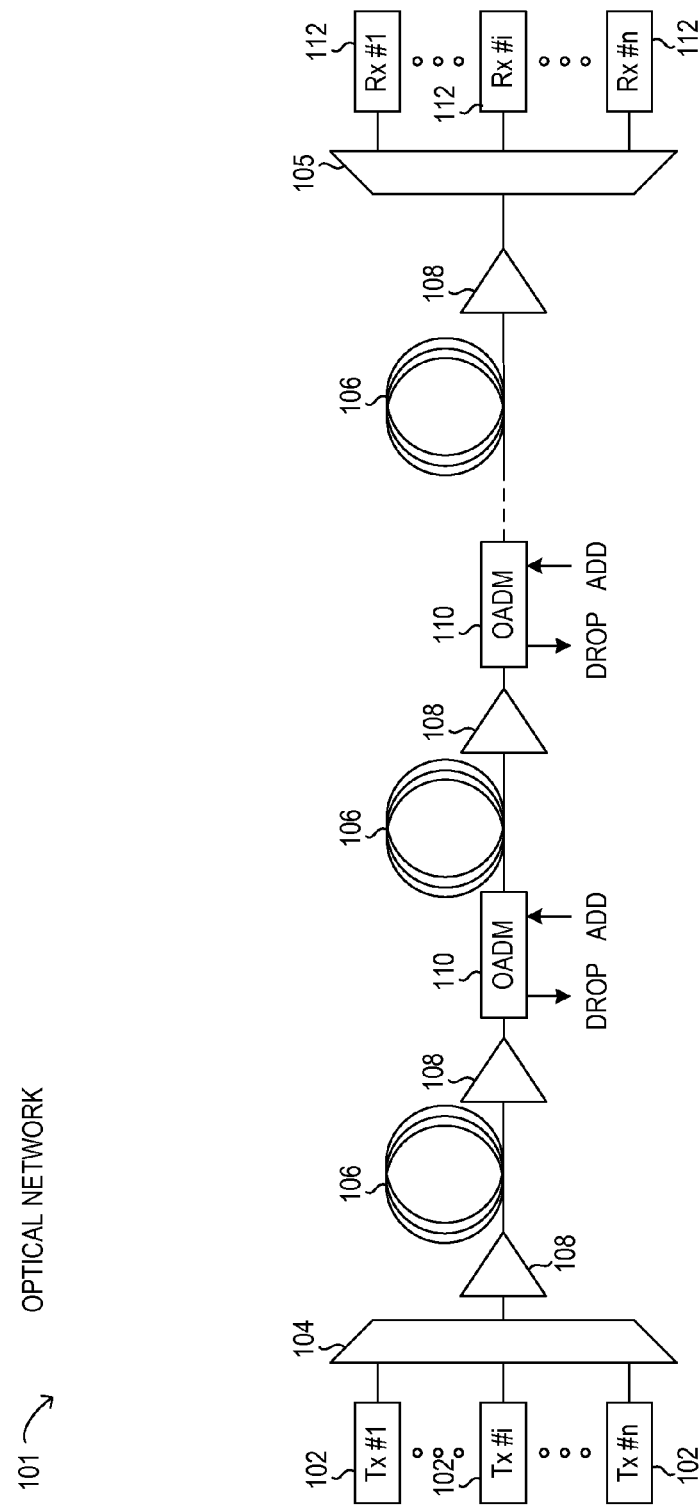
FIG. 1 is a block diagram of selected elements of an embodiment of an optical network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Referring now to the drawings, FIG. 1 illustrates an example embodiment of optical network 101, which may represent an optical communication system. Optical network 101 may include one or more optical fibers 106 to transport one or more optical signals communicated by components of optical network 101. The network elements of optical network 101, coupled together by fibers 106, may comprise one or more transmitters 102, one or more multiplexers (MUX) 104, one or more optical amplifiers 108, one or more optical add/drop multiplexers (OADM) 110, one or more demultiplexers (DEMUX) 105, and one or more receivers 112.

Optical network 101 may comprise a point-to-point optical network with terminal nodes, a ring optical network, a mesh optical network, or any other suitable optical network or combination of optical networks. Optical network 101 may be used in a short-haul metropolitan network, a long-haul inter-city network, or any other suitable network or combination of networks. The capacity of optical network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a standard Single-Mode Fiber (SMF), Enhanced Large Effective Area Fiber (E-LEAF), or TrueWave® Reduced Slope (TW-RS) fiber.

Optical network 101 may include devices to transmit optical signals over optical fibers 106. Information may be transmitted and received through optical network 101 by modulation of one or more wavelengths of light to encode the information on the wavelength. In optical networking, a wavelength of light may also be referred to as a channel that is included in an optical signal. Each channel may carry a certain amount of information through optical network 101.

To increase the information capacity and transport capabilities of optical network 101, multiple signals transmitted at multiple channels may be combined into a single wide bandwidth optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical network 101 may transmit disparate channels using WDM or some other suitable multi-channel multiplexing technique, and to amplify the multi-channel signal.

Optical network 101 may include one or more optical transmitters (Tx) 102 to transmit optical signals through optical network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical network 101.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical network 101. Optical amplifiers 108 may be positioned before and/or after certain lengths of fiber 106. Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of a pump signal to excite the atoms of the doped portion of the optical fiber, which increases the intensity of the optical signal. As an example, optical amplifiers 108 may comprise an erbium-doped fiber amplifier (EDFA).

OADMs 110 may be coupled to optical network 101 via fibers 106. OADMs 110 comprise an add/drop module, which may include a system, apparatus or device to add and/or drop optical signals (i.e., at individual wavelengths) from fibers 106. After passing through an OADM 110, an optical signal may travel along fibers 106 directly to a destination, or the signal may be passed through one or more additional OADMs 110 and/or optical amplifiers 108 before reaching a destination.

In certain embodiments of optical network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown) that may be included in a ROADM.

As shown in FIG. 1, optical network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical network 101 may transmit and carry a forty (40) channel DWDM signal.

Demultiplexer 105 may divide the single, forty channel DWDM signal into forty separate signals according to the forty different channels.

In FIG. 1, optical network 101 may also include receivers 112 coupled to demultiplexer 105. Each receiver 112 may receive optical signals transmitted at a particular wavelength or channel, and may process the optical signals to obtain (demodulate) the information (data) that the optical signals contain. Accordingly, network 101 may include at least one receiver 112 for every channel of the network.

Optical networks, such as optical network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

Additionally, polarization division multiplexing (PDM) technology may enable achieving a greater bit rate for information transmission. PDM transmission comprises modulating information onto various polarization components of an optical signal associated with a channel. The polarization of an optical signal may refer to the direction of the oscillations of the optical signal. The term "polarization" may generally refer to the path traced out by the tip of the electric field vector at a point in space, which is perpendicular to the propagation direction of the optical signal.

In certain embodiments, optical network 101 may transmit a superchannel, in which a plurality of subcarrier signals (or subchannels or channels) are densely packed in a fixed bandwidth band and may be transmitted at very high data rates, such as 400 Gb/s, 1 Tb/s, or higher. Furthermore, the superchannel may be well suited for transmission over very long distances, such as hundreds of kilometers, for example. A typical super-channel may comprise a set of subcarriers that are frequency multiplexed to form a single channel that are transmitted through optical network 101 as one entity. The subcarriers within the superchannel may be tightly packed to achieve high spectral efficiency.

In an optical network, such as optical network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, and/or an operational support system (OSS) which handles network-wide operations.

Modifications, additions or omissions may be made to optical network 101 without departing from the scope of the disclosure. For example, optical network 101 may include more or fewer elements than those depicted in FIG. 1. Also, as mentioned above, although depicted as a point-to-point network, optical network 101 may comprise any suitable network topology for transmitting optical signals such as a ring, a mesh, and/or a hierarchical network topology.

As discussed above, the amount of information that may be transmitted over an optical network may vary with the number of optical channels coded with information and multiplexed into one signal. Accordingly, an optical fiber employing a WDM signal may carry more information than an optical fiber that carries information over a single channel. Besides the number of channels and number of polarization components carried, another factor that affects how much information can be transmitted over an optical network may be the bit rate of transmission. The higher the bit rate, the greater the transmitted information capacity. Achieving higher bit rates may be limited by the availability of wide bandwidth electrical driver technology, digital signal processor technology and increase in the required OSNR for transmission over optical network 101.

In operation of optical network 101, as data rates approach 1 T a correspondingly high OSNR becomes desirable to maintain economic feasibility by avoiding excessive numbers of O-E-O regenerators. Accordingly, it may be desirable to accurately and instantaneously measure in-band OSNR for a given optical channel transmitted by optical network 101. Such measurement of in-band OSNR may enable real-time monitoring of node-to-node and point-to-point transmission performance of optical network 101 and associated systems and devices. OSNR monitoring may enable determining an optical channel's reachability as well as detecting any failure point in optical network 101. In some embodiments, OSNR monitoring may be included with an OADM node in optical network 101. Industry standards, such as promulgated by the International Telecommunication Union Telecommunication Standardization Sector (ITU-T), suggest that an error of the monitored OSNR should be within ±1 dB accuracy over a wide range of OSNR. A typical OSNR monitor will include an optical filter to discriminate a given optical channel for OSNR measurement. When spectral offset occurs, OSNR measurements may be inaccurate because a nominal wavelength of an optical channel may not match an actual wavelength of the optical channel. Spectral offset may also occur when an optical filter is not calibrated to the same spectral reference and precision as the optical channel.

As will be described in further detail, methods and systems are disclosed herein for implementing a scanning optical filter that may reduce or eliminate spectral offset during optical filtering. The scanning optical filter disclosed herein may be tunable to a desired frequency (or wavelength) for flexible operation with different channels and formats. The scanning optical filter disclosed herein may adapt to various input optical signals and may be immune to spectral offset in input optical signals. The scanning optical filter disclosed herein may provide a cost-effective mitigation technique for spectral offset. The scanning optical filter disclosed herein may enable accurate in-band OSNR monitoring that accurately measures peak signal power and determines a wavelength for the peak signal power. The scanning optical filter disclosed herein may enable accurate in-band OSNR monitoring that measures in-band noise that represents true noise information that may be different for each optical channel, for example, due to add/drop events affecting each channel individually.

Figure 2:
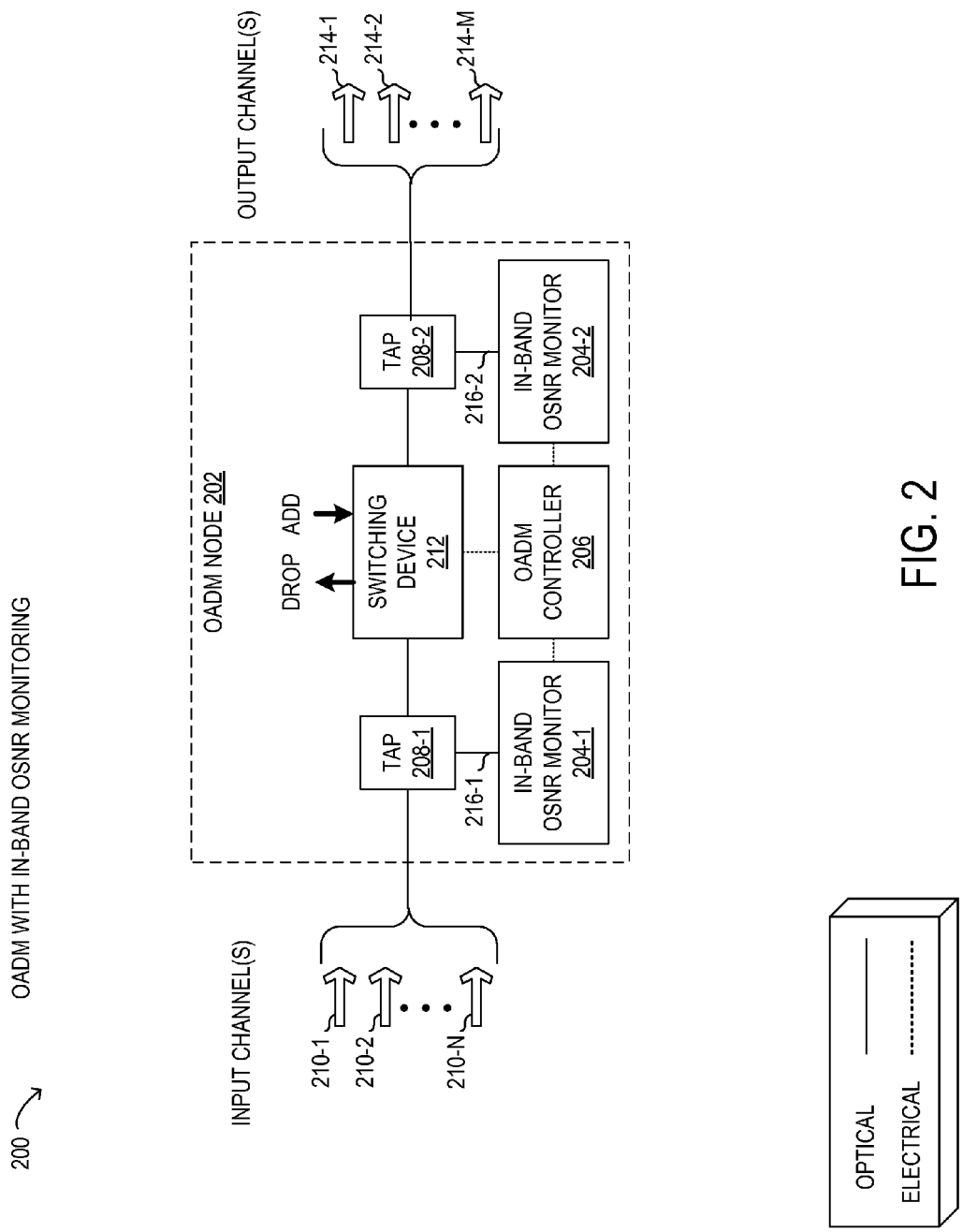
FIG. 2 is a block diagram of selected elements of an embodiment of an optical add drop multiplexer with an in-band OSNR monitoring.

Referring now to FIG. 2, selected elements of an example embodiment of OADM 200 with in-band OSNR monitoring are depicted. As shown, OADM 200 includes OADM node 202, which may represent selected elements of an embodiment of OADM 110 (see FIG. 1). OADM 200 may add or drop optical signals in optical network 101.

In OADM 200, OADM node 202 may receive input channels (i.e., optical signals) 210 and may transmit output channels 214. Input channels 210 and output channels 214 may be in the form of a WDM signal. In certain embodiments, input channels 210 may represent a superchannel. As shown, input channels 210 comprise N number of channels, designated 210-1, 210-2, and so on, up to 210-N. Output channels 214 output by OADM node 202 may comprise M number of channels, designated 214-1, 214-2, and so on, up to 214-M. It is noted that N and M may be different, depending on add/drop events performed by OADM node 202 and may have any value greater than or equal to 1. When N=1, input channels 210 may comprise a single channel, even though input channels 210 is used herein in the plural form. When M=1, output channels 214 may comprise a single channel, even though output channels 214 is used herein in the plural form.

As shown, OADM node 202 includes tap 208 respectively associated with in-band OSNR monitor 204. Tap 208 may divert a portion of the optical signal power that is representative of the optical signal to in-band OSNR monitor 204, such as 1-10% of the optical signal power, shown as power tap signal 216. In-band OSNR monitor 204 may receive power tap signal 216 and output an in-band OSNR value to OADM controller 206. As shown, tap 208-1 provides power tap signal 216-1 to in-band OSNR monitor 204-1 from input channels 210, while tap 208-2 provides power tap signal 216-2 to in-band OSNR monitor 204-2 from output channels 214. OADM controller 206 may be further coupled to switching device 212 that performs optical channel switching to add or drop channels, for example, from other optical network segments. In this manner, OADM node 202 may provide connectivity to different optical networks and network topologies, while monitoring in-band OSNR of input channels 210 and output channels 214.

In operation, in-band OSNR monitor 204 may digitally sample an in-band optical signal for a particular optical channel to generate power waveform data. An optical filter included with in-band OSNR monitor 204 (see FIG. 4) may be programmed to pass a desired passband corresponding to the optical channel. The power waveform data is sampled over the passband corresponding to the optical channel. The power waveform data may then be processed by in-band OSNR monitor 204 to obtain low-pass filtered power, $P_{LPF}$, and band-pass filtered power, $P_{BPF}$. The signal power, $P_{sig}$, may be expressed in terms of $P_{LPF}$, as given by Equation 1.

$$P_{sig} = \frac{P_{LPF} * \Omega}{C_1 \left[1 + \frac{B_0}{R_{res} * OSNR}\right]} \quad \text{Equation 1}$$

In Equation 1, $C_1$ is a calibration constant associated with the low-pass filter, $B_o$ is the optical bandwidth, $R_{res}$ is the measurement resolution which is normally set to 12.5 GHz, and OSNR is the in-band OSNR. Furthermore, $P_{BPF}$ may be expressed in terms of the signal power, $P_{sig}$, as given by Equation 2.

$$P_{BPF} = C_2 B_F (P_{sig})^2 + C_3 B_F \frac{2R_{PD}^2}{R_{res}} (P_{sig})^2 \left(\frac{\alpha_1}{OSNR} + \frac{B_o \alpha_2}{2R_{res} OSNR^2}\right) \quad \text{Equation 2}$$

In Equation 2, $C_2$, $C_3$, $\alpha_1$, $\alpha_2$ and $\Omega$ are calibration constants associated with the type of incoming signal and the band-pass filter, $B_F$ is the bandwidth of the bandpass filter, $R_{PD}$ is the optical-to-electrical responsivity of the photo-detector used to sample the optical power, and the remaining terms are the same as in Equation 1. In Equations 1 and 2, the calibration constants are defined in advance, and once the low-pass filtered power, $P_{LPF}$, and the band-pass filtered power, $P_{BPF}$, are measured as described above, OSNR remains the only unknown term. Accordingly, by substituting Equation 1 into Equation 2, OSNR may be calculated.

Furthermore, the optical filter used in OSNR monitor 204 may be a scanning optical filter that can mitigate spectral offset. For example, a nominal wavelength of input optical channels 210 may not precisely correspond to a physical wavelength. Similarly, the optical filter may not be precisely calibrated in wavelength. For these reasons, spectral offset may occur during optical filtering of the passband and may affect the accuracy of OSNR measurements, in some embodiments. In other applications of optical filtering, spectral offset may also be undesirable and may adversely affect operations of optical networks.

As will be described in further detail, spectral offset in an optical filter may be mitigated with a scanning optical filter, as described in further detail herein. The scanning optical filter may measure an optical power value of the optical channel at different wavelengths within the passband using various methods and operations described herein to obtain a maximum optical power value, as well as an effective wavelength for the optical channel corresponding to the maximum optical power value.

Figure 3:
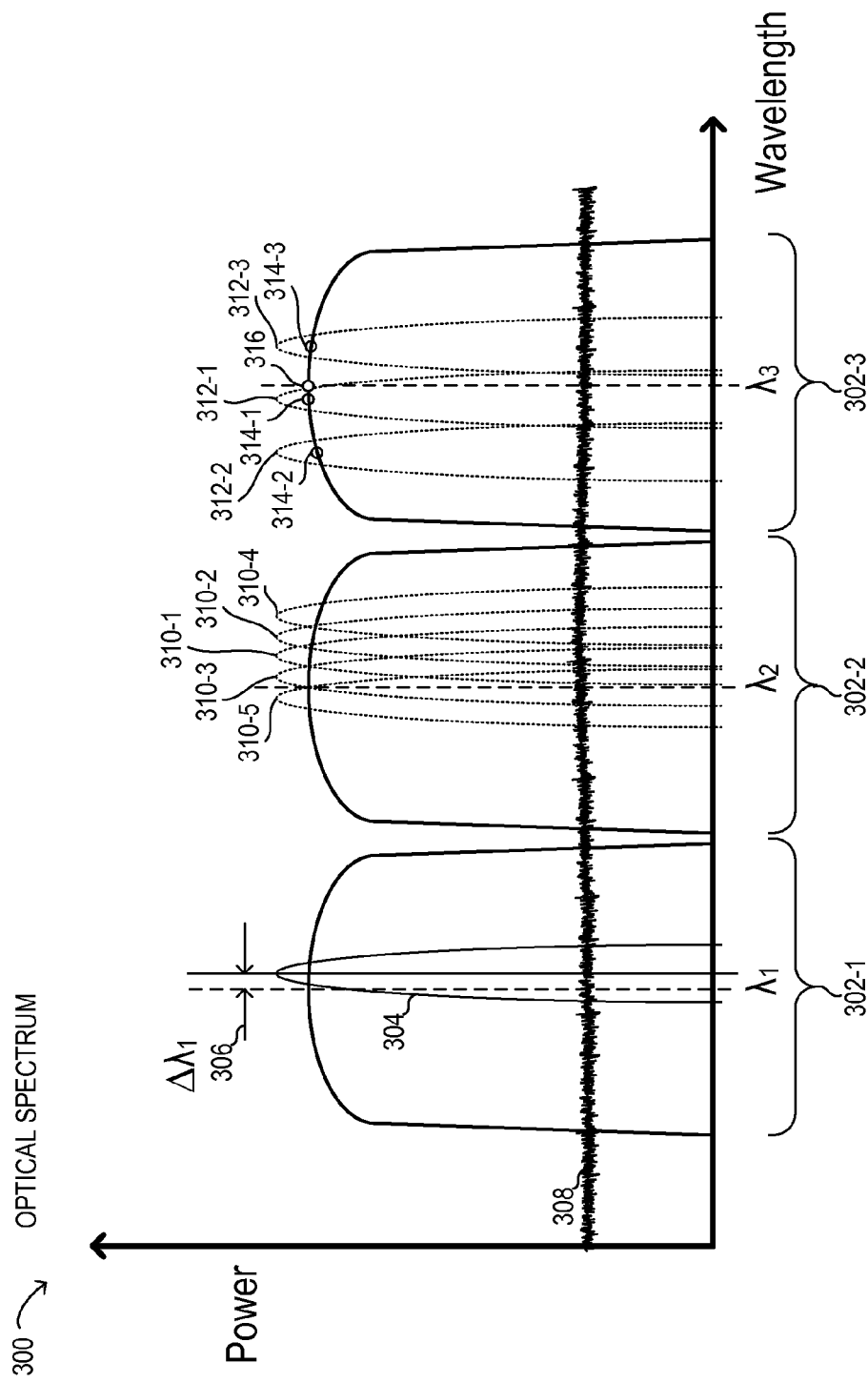
FIG. 3 is a diagram of selected elements of an embodiment of an optical spectrum illustrating mitigation of spectral offset in an optical filter.

Referring now to FIG. 3, selected elements of an example embodiment of optical spectrum 300 are depicted. As shown, optical spectrum 300 shows Power versus Wavelength for 3 optical channels 302 of a WDM optical signal at nominal wavelengths $\lambda_1$, $\lambda_2$, and $\lambda_3$. Optical channels 302 shown in optical spectrum 300 may represent Nyquist or non-Nyquist optical channels. Also shown is optical noise level 308, which may vary with wavelength.

In optical spectrum 300, spectral offset is depicted with respect to first optical channel 302-1 at nominal wavelength $\lambda_1$. In first optical channel 302-1, passband 304 may represent a passband of an optical filter, such as scanning optical filter 400 in FIG. 4. Passband 304 may have been programmed at nominal wavelength $\lambda_1$. However, due to various reasons described previously, passband 304 is shifted by spectral offset 306 by an amount $\Delta\lambda_1$, such that passband 304 is actually centered at wavelength $\lambda_1+\Delta\lambda_1$. As a result, spectral offset 306 may result in inaccurate measurement of a maximum optical power value for first optical channel 302-1.

In optical spectrum 300, an embodiment of operation of a scanning optical filter, as described herein, is illustrated with respect to second optical channel 302-2 at nominal wavelength $\lambda_2$. In second optical channel 302-2, a first passband 310-1 may correspond to a passband of the scanning optical filter when programmed with nominal wavelength $\lambda_2$. A first optical power value may be measured at first passband 310-1. The scanning optical filter may be programmed to add (or subtract) a wavelength interval to the nominal wavelength $\lambda_2$ and set passband 310-2. The wavelength interval may be selected from a corresponding frequency interval of 0.5 GHz, 1 GHz, and 2 GHz, among other values. Then, a second optical power value for second optical channel 302-2 may be measured at passband 310-2. Additional optical power values may be measured at additional passbands 310-3, 310-4, and 310-5. Passbands 310 may be equidistant apart from one another in wavelength. From the measured passbands 310, the maximum optical power value and a corresponding wavelength of passband 310 may be determined.

The maximum optical power may be determined by different methods when scanning passbands 310. In one embodiment, a fixed number of passbands 310 at a predetermined wavelength interval from each other may be automatically scanned and then the maximum optical power value may be taken from the measured optical power values. The scanned passbands 310 may be centered around first passband 310-1. In another embodiment, an iterative approach may be used. In the iterative approach, a first wavelength interval step may be applied to first passband 310-1 to select second passband 310-2. The optical power values for first passband 310-1 and second passband 310-2 may be compared. When second passband 310-2 results in a smaller optical power value, a wavelength interval step in an opposing direction may then be taken from passband 310-1 to third passband 310-3. The optical power values for first passband 310-1 and third passband 310-3 may then be compared. When third passband 310-3 results in a higher optical power value than first passband 310-1, an additional scan may be taken resulting in passband 310-5. In this manner, optical channel 302-2 may be iteratively scanned in an adaptive manner to locate the maximum optical power value.

In optical spectrum 300, yet another method for mitigation of spectral offset is illustrated with respect to optical channel 302-3, namely using spectral interpolation. A first passband 312-1 may be set at the scanning optical filter using nominal wavelength $\lambda 3$ and a first optical power value 314-1 may be measured. Then, two additional passbands 312-2 and 312-3 may be set and a second optical power value 314-2 and a third optical power value 314-3 may be measured. Passbands 312 may be selected to cover a certain portion of a signal bandwidth of optical channel 302-3, such as a certain minimum portion. Using optical power values 314, maximum optical power value 316 may be determined by a spectral interpolation technique, such as a peak detection algorithm. When maximum optical power value 316 is known, an actual wavelength setting for the optical filter corresponding to wavelength $\lambda 3$ is also determined.

Figure 4:
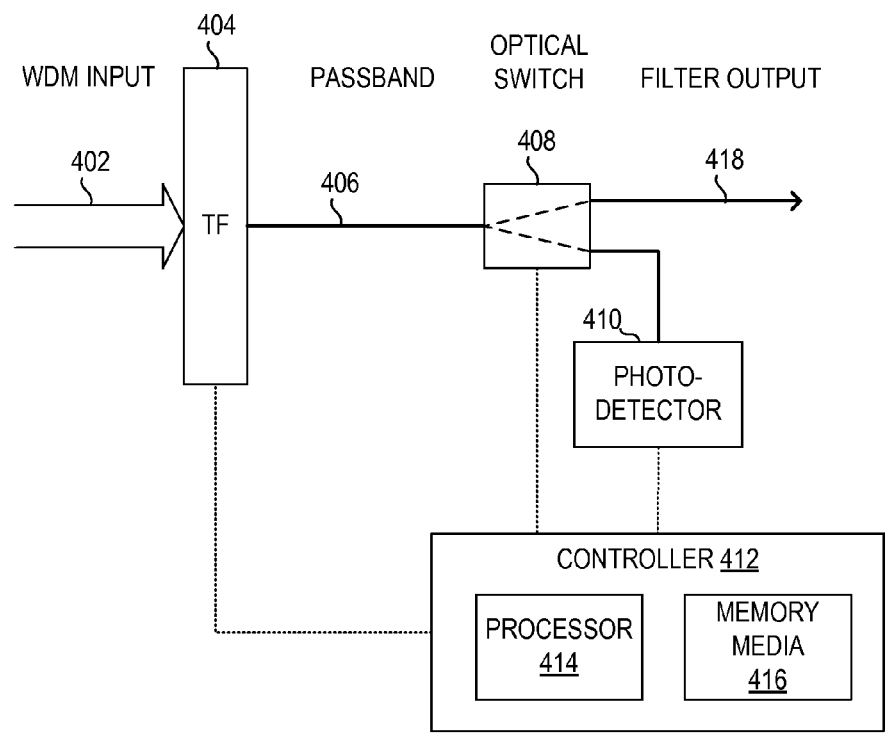
FIG. 4 is a diagram of selected elements of an embodiment of an optical filter for mitigation of spectral offset.
Figure 4:
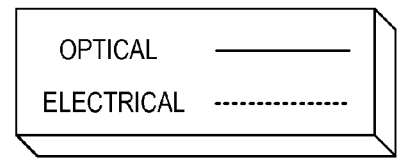

Referring now to FIG. 4, a block diagram of selected elements of an embodiment of scanning optical filter 400 for mitigation of spectral offset, as described herein, is depicted. Scanning optical filter 400 is a schematic representation and is not drawn to scale. It is noted that in various embodiments, scanning optical filter 400 may be implemented with additional or fewer elements than depicted in FIG. 4. As shown, scanning optical filter 400 includes tunable filter module 404, optical switch 408, photo-detector 410, and controller 412, comprising processor 414 and memory media 416.

As shown in FIG. 4, controller 412 includes processor 414 and memory media 416, which may store executable instructions (i.e., executable code) that may be executable by processor 414, which has access to memory media 416. Processor 414 may execute instructions that cause controller 412 to perform the functions and operations described herein. For the purposes of this disclosure, memory media 416 may include non-transitory computer-readable media that stores data and instructions for at least a period of time. Memory media 416 may comprise persistent and volatile media, fixed and removable media, and magnetic and semiconductor media. Memory media 416 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and flash memory; non-transitory media, or various combinations of the foregoing. Memory media 416 is operable to store instructions, data, or both.

In operation of scanning optical filter 400, tunable filter module 404 may be a programmable optical filter that can receive WDM input 402 as well as filter parameters specifying passband 406, such as wavelength, bandwidth, etc. WDM input 402 may correspond to power tap signal 216 in FIG. 2. Tunable filter module 404 then optically discriminates WDM input 402 (or another multispectral input) to generate passband 406, representing an optically filtered signal. Passband 406 may correspond to any one of passbands 304, 310, 312 shown in FIG. 3, or another passband, as desired. Controller 412 may output a control signal to tunable filter module 404 to program tunable filter module 404 to generate passband 406, as desired. Passband 406 may be selectively switched to filter output 418 or photo-detector 410 using optical switch 408, which may be operated by controller 412. It is noted that other types of optical diversion elements may be used in place of optical switch 408 in various embodiments. Photo-detector 410 may measure an optical power value of passband 406, which may be acquired by controller 412. In response to the measured optical power value at photo-detector 410, controller 412 may make scanning decisions and implement various methods for mitigation of spectral offset, as described herein. The process for scanning to mitigate spectral offset may last for a relatively short duration. After the maximum optical power value has been located, optical switch 408 may switch to filter output 418, such that substantially all the optical power in passband 406 is transmitted from scanning optical filter 400, for example, to accurately measure OSNR. It is noted that controller 412 may communicate externally, for example with OADM controller 206, with control system 600 in FIG. 6, or other entities, to coordinate or exchange information with respect to scanning and optical filtering.

Figure 5:
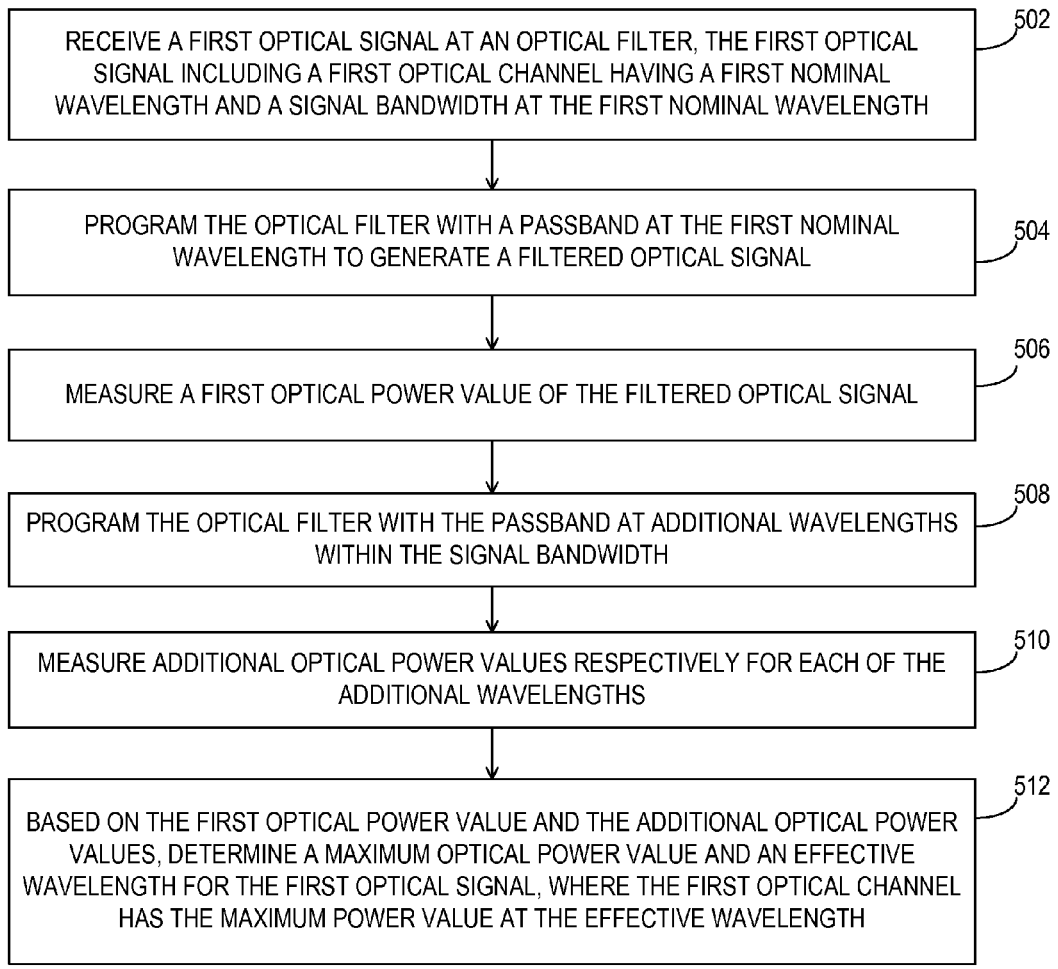
FIG. 5 is a flow diagram of selected elements of an embodiment of a method for mitigation of spectral offset in an optical filter.

Referring now to FIG. 5, a block diagram of selected elements of an embodiment of method 500 for mitigation of spectral offset in an optical filter, as described herein, is depicted in flowchart form. Method 500 may be performed using scanning optical filter 400. At least certain portions of method 500 may be performed by a processor having access to memory media storing instructions executable by the processor, for example, such as processor 414 in controller 412. It is noted that certain operations described in method 500 may be optional or may be rearranged in different embodiments.

Method 500 may begin by receiving (operation 502) a first optical signal at an optical filter, the first optical signal including a first optical channel having a first nominal wavelength and a signal bandwidth at the first nominal wavelength. The optical filter is programmed (operation 504) with a passband at the first nominal wavelength to generate a filtered optical signal. A first optical power value of the filtered optical signal is measured (operation 506). The optical filter is programmed (operation 508) with the passband at additional wavelengths within the signal bandwidth. The additional wavelengths may be selected in advance or may be iteratively selected, for example, depending on measured optical power values. Additional optical power values are measured (operation 510), respectively, for each of the additional wavelengths. Based on the first optical power value and the additional optical power values, a maximum optical power value and an effective wavelength for the first optical signal are determined (operation 512) where the first optical channel has the maximum power value at the effective wavelength.

Figure 6:
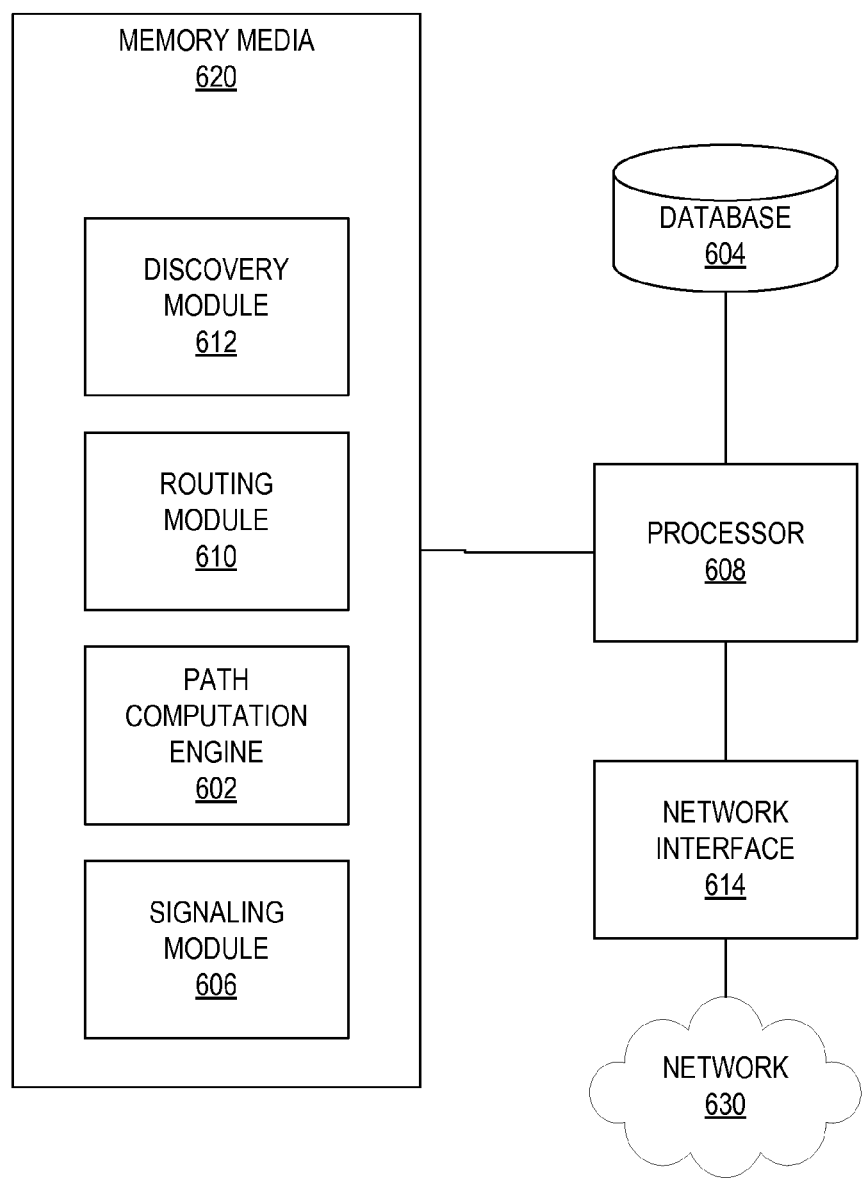
FIG. 6 is a block diagram of selected elements of an embodiment of a control system for an optical network.

Referring now to FIG. 6, a block diagram of selected elements of an embodiment of control system 600 for implementing control plane functionality in optical networks, such as, for example, in optical network 101 (see FIG. 1), is illustrated. A control plane may include functionality for network intelligence and control and may comprise applications that support the ability to establish network services, including applications or modules for discovery, routing, path computation, and signaling, as will be described in further detail. The control plane applications executed by control system 600 may work together to automatically establish services within the optical network. Discovery module 612 may discover local links connecting to neighbors. Routing module 610 may broadcast local link information to optical network nodes while populating database 604. When a request for service from the optical network is received, path computation engine 602 may be called to compute a network path using database 604. This network path may then be provided to signaling module 706 to establish the requested service.

As shown in FIG. 6, control system 600 includes processor 608 and memory media 620, which may store executable instructions (i.e., executable code) that may be executable by processor 608, which has access to memory media 620. Processor 608 may execute instructions that cause control system 600 to perform the functions and operations described herein. For the purposes of this disclosure, memory media 620 may include non-transitory computer-readable media that stores data and instructions for at least a period of time. Memory media 620 may comprise persistent and volatile media, fixed and removable media, and magnetic and semiconductor media. Memory media 620 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and flash memory; non-transitory media, or various combinations of the foregoing. Memory media 620 is operable to store instructions, data, or both. Memory media 620 as shown includes sets or sequences of instructions that may represent executable computer programs, namely, path computation engine 602, signaling module 606, discovery module 612, and routing module 610.

Also shown included with control system 600 in FIG. 6 is network interface 614, which may be a suitable system, apparatus, or device operable to serve as an interface between processor 608 and network 630. Network interface 614 may enable control system 600 to communicate over network 630 using a suitable transmission protocol or standard. In some embodiments, network interface 614 may be communicatively coupled via network 630 to a network storage resource. In some embodiments, network 630 may be an embodiment of at least certain portions of optical network 101. Network 630 may also include certain portions of a network using galvanic or electronic media. In certain embodiments, network 630 may include at least certain portions of a public network, such as the Internet. Network 630 may be implemented using hardware, software, or various combinations thereof.

In certain embodiments, control system 600 may be configured to interface with a person (i.e., a user) and receive data about the optical signal transmission path. For example, control system 600 may also include or may be coupled to one or more input devices and output devices to facilitate receiving data about the optical signal transmission path from the user and to output results to the user. The one or more input or output devices (not shown) may include, but are not limited to, a keyboard, a mouse, a touchpad, a microphone, a display, a touchscreen display, an audio speaker, or the like. Alternately or additionally, control system 600 may be configured to receive data about the optical signal transmission path from a device such as another computing device or a network element, for example via network 630.

As shown in FIG. 6, in some embodiments, discovery module 612 may be configured to receive data concerning an optical signal transmission path in an optical network and may be responsible for discovery of neighbors and links between neighbors. In other words, discovery module 612 may send discovery messages according to a discovery protocol, and may receive data about the optical signal transmission path. In some embodiments, discovery module 612 may determine features, such as, but not limited to: fiber type, fiber length, number and type of components, data rate, modulation format of the data, input power of the optical signal, number of signal carrying wavelengths (i.e., channels), channel spacing, traffic demand, and network topology, among others.

As shown in FIG. 6, routing module 610 may be responsible for propagating link connectivity information to various nodes within an optical network, such as optical network 101. In particular embodiments, routing module 610 may populate database 604 with resource information to support traffic engineering, which may include link bandwidth availability. Accordingly, database 604 may be populated by routing module 610 with information usable to determine a network topology of an optical network.

Path computation engine 602 may be configured to use the information provided by routing module 610 to database 604 to determine transmission characteristics of the optical signal transmission path. The transmission characteristics of the optical signal transmission path may provide insight on how transmission degradation factors, such as chromatic dispersion (CD), nonlinear (NL) effects, polarization effects, such as polarization mode dispersion (PMD) and polarization dependent loss (PDL), and amplified spontaneous emission (ASE), among others, may affect optical signals within the optical signal transmission path. To determine the transmission characteristics of the optical signal transmission path, path computation engine 602 may consider the interplay between the transmission degradation factors. In various embodiments, path computation engine 602 may generate values for specific transmission degradation factors. Path computation engine 602 may further store data describing the optical signal transmission path in database 604.

In FIG. 6, signaling module 606 may provide functionality associated with setting up, modifying, and tearing down end-to-end networks services in an optical network, such as optical network 101. For example, when an ingress node in the optical network receives a service request, control system 100 may employ signaling module 606 to request a network path from path computation engine 602 that may be optimized according to different criteria, such as bandwidth, cost, etc. When the desired network path is identified, signaling module 606 may then communicate with respective nodes along the network path to establish the requested network services. In different embodiments, signaling module 606 may employ a signaling protocol to propagate subsequent communication to and from nodes along the network path.

In operation of control system 600, controller 412 in scanning optical filter 400 described previously may communicate with control system 600 for network monitoring and control operations. For example, in association with measuring OSNR at particular network nodes, such as OADM nodes, controller 412 may receive settings for tunable optical filter module 404 corresponding to specific optical channels.

As disclosed herein, methods and systems for mitigating spectral offset may use a scanning optical filter to scan different frequencies (or wavelengths) in a signal bandwidth of an optical channel. The maximum optical power value for the optical channel may be accurate determined as well as an effective wavelength corresponding to the maximum optical power value.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for mitigating spectral offset in an optical filter, the method comprising:
   receiving a first optical signal at an optical filter, the first optical signal including a first optical channel having a first nominal wavelength and a signal bandwidth at the first nominal wavelength;
   programming the optical filter with a passband at the first nominal wavelength to generate a filtered optical signal;
   measuring a first optical power value of the filtered optical signal;
   programming the optical filter with the passband at additional wavelengths within the signal bandwidth of the first optical channel;
   measuring additional optical power values respectively for each of the additional wavelengths; and
   based on the first optical power value and the additional optical power values, determining a maximum optical power value and an effective wavelength for the first optical signal, wherein the first optical channel has the maximum power value at the effective wavelength.

2. The method of claim 1, wherein programming the optical filter with the passband at the additional wavelengths further comprises:
   selecting the additional wavelengths based on a given wavelength interval from the first nominal wavelength.

3. The method of claim 2, wherein the additional wavelengths consist of two wavelengths, the two wavelengths at a positive interval of the given wavelength interval and at a negative interval of the given wavelength interval from the first nominal wavelength, and further comprising:
   using the first optical power value and two additional optical power values corresponding to the two wavelengths to spectrally interpolate the maximum power value.

4. The method of claim 2, wherein the additional wavelengths include a plurality of wavelengths near the first nominal wavelength, and further comprising:
   selecting the maximum power value as a maximum of the first optical power value and the additional optical power values.

5. The method of claim 2, wherein the given wavelength interval is selected from a corresponding frequency interval of 0.5 GHz, 1 GHz, and 2 GHz.

6. The method of claim 1, wherein programming the optical filter with the passband at the additional wavelengths and measuring the additional optical power values further comprises:
   scanning the first optical channel at a given wavelength interval step from the first nominal wavelength until the maximum power value is determined.

7. The method of claim 6, wherein scanning the first optical channel at the given wavelength interval step includes using a positive interval and a negative interval.

8. A scanning optical filter, comprising:
   an optical input to receive a first optical signal, the first optical signal including a first optical channel having a first nominal wavelength and a signal bandwidth at the first nominal wavelength;
   a tunable filter module coupled to the optical input to:
     receive the first optical signal and to transmit a passband; and
     receive an electrical input to program the passband;
   a photo-detector to measure optical power values from the passband; and
   a controller to receive the optical power values from the photo-detector, the controller including a processor and memory media storing instructions executable by the processor to:
     program the tunable filter module with the passband at the first nominal wavelength to generate a filtered optical signal;
     measure a first optical power value of the filtered optical signal;
     program the tunable filter module with the passband at additional wavelengths within the signal bandwidth of the first optical channel;
     measure additional optical power values respectively for each of the additional wavelengths; and
     based on the first optical power value and the additional optical power values, determine a maximum optical power value and an effective wavelength for the first optical signal, wherein the first optical channel has the maximum power value at the effective wavelength.

9. The scanning optical filter of claim 8, wherein the instructions to program the optical filter with the passband at the additional wavelengths further comprises instructions to select the additional wavelengths based on a given wavelength interval from the first nominal wavelength.

10. The scanning optical filter of claim 9, wherein the additional wavelengths consist of two wavelengths at a positive interval of the given wavelength interval and at a negative interval of the given wavelength interval from the first nominal wavelength, and further comprising instructions to:
use the first optical power value and two additional optical power values corresponding to the two wavelengths to spectrally interpolate the maximum power value.

11. The scanning optical filter of claim 9, wherein the additional wavelengths include a plurality of wavelengths near the first nominal wavelength, and further comprising instructions to:
select the maximum power value as a maximum of the first optical power value and the additional optical power values.

12. The scanning optical filter of claim 9, wherein the given wavelength interval is selected from a corresponding frequency interval of 0.5 GHz, 1 GHz, and 2 GHz.

13. The scanning optical filter of claim 8, wherein the instructions to program the optical filter with the passband at the additional wavelengths and the instructions to measure the additional optical power values further comprise instructions to:
scan the first optical channel at a given wavelength interval step from the first nominal wavelength until the maximum power value is determined.

14. The scanning optical filter of claim 13, wherein the instructions to scan the first optical channel at the given wavelength interval step include instructions to use a positive interval and a negative interval.

15. An optical signal-to-noise ratio (OSNR) monitor including a scanning optical filter, the scanning optical filter comprising:
an optical input to receive a first optical signal, the first optical signal including a first optical channel having a first nominal wavelength and a signal bandwidth at the first nominal wavelength;
a tunable filter module coupled to the optical input to:
receive the first optical signal and to transmit a passband; and
receive an electrical input to program the passband;
a photo-detector to measure optical power values from the passband;
a controller to receive the optical power values from the photo-detector, the controller including a processor and memory media storing instructions executable by the processor to:
program the tunable filter module with the passband at the first nominal wavelength to generate a filtered optical signal;
measure a first optical power value of the filtered optical signal;
program the tunable filter module with the passband at additional wavelengths within the signal bandwidth of the first optical channel;
measure additional optical power values respectively for each of the additional wavelengths; and
based on the first optical power value and the additional optical power values, determine a maximum optical power value and an effective wavelength for the first optical signal, wherein the first optical channel has the maximum power value at the effective wavelength.

16. The OSNR monitor of claim 15, wherein the instructions to program the optical filter with the passband at the additional wavelengths further comprises instructions to select the additional wavelengths based on a given wavelength interval from the first nominal wavelength.

17. The OSNR monitor of claim 16, wherein the additional wavelengths consist of two wavelengths at a positive interval of the given wavelength interval and at a negative interval of the given wavelength interval from the first nominal wavelength, and further comprising instructions to:
use the first optical power value and two additional optical power values corresponding to the two wavelengths to spectrally interpolate the maximum power value.

18. The OSNR monitor of claim 16, wherein the additional wavelengths include a plurality of wavelengths near the first nominal wavelength, and further comprising instructions to:
select the maximum power value as a maximum of the first optical power value and the additional optical power values.

19. The OSNR monitor of claim 16, wherein the given wavelength interval is selected from a corresponding frequency interval of 0.5 GHz, 1 GHz, and 2 GHz.

20. The OSNR monitor of claim 15, wherein the instructions to program the optical filter with the passband at the additional wavelengths and the instructions to measure the additional optical power values further comprise instructions to:
scan the first optical channel at a given wavelength interval step from the first nominal wavelength until the maximum power value is determined.

21. The OSNR monitor of claim 20, wherein the instructions to scan the first optical channel at the given wavelength interval step include instructions to use a positive interval and a negative interval.

* * * * *